United States Patent [19]

Alwers

[11] 3,772,526

[45] Nov. 13, 1973

[54] APPARATUS FOR STARTING A GAS TURBINE WHICH IS SHAFT-COUPLED TO A SYNCHRONOUS GENERATOR AND TO A TURN-DRIVE WITH CLUTCH RELEASE

[75] Inventor: Edgar Alwers, Mannheim, Germany

[73] Assignee: Aktiengesellschaft Brown Boveri & Cie, Baden, Switzerland

[22] Filed: Nov. 15, 1971

[21] Appl. No.: 198,792

[52] U.S. Cl............................ 290/38, 290/1, 290/37, 290/52, 318/231, 318/171, 318/41 S
[51] Int. Cl. ............................................. H02p 9/04
[58] Field of Search ................. 318/231, 41 S, 171; 290/38, 52, 37; 322/61; 60/39.14

[56] References Cited
UNITED STATES PATENTS

| | | | |
|---|---|---|---|
| 3,543,038 | 11/1970 | Putz et al............................ | 290/46 |
| 2,743,111 | 4/1956 | Abell et al. .......................... | 322/61 |
| 2,778,985 | 7/1957 | Schmitz ............................... | 322/61 |
| 3,271,579 | 9/1966 | Erismann .......................... | 290/38 X |
| 3,264,482 | 8/1966 | Clark et al. .......................... | 290/38 |
| 2,723,531 | 11/1955 | Wosika et al. .................. | 60/39.14 X |
| 3,187,188 | 6/1965 | Adkins et al. ...................... | 290/52 X |
| 3,070,740 | 12/1962 | Chirgwin ............................ | 322/61 X |

Primary Examiner—G. R. Simmons
Attorney—Ralph E. Parker et al.

[57] ABSTRACT

Apparatus for starting from standstill a gas turbine which is shaft coupled to a synchronous alternating current generator and bringing the turbine up to an intermediate "acceleration" speed where it becomes able to supply sufficient torque to further accelerate the generator up to its synchronous speed where it can be connected into the power network includes a turn-drive coupled to the turbine shaft for initially starting the turbine and generator to rotate and for also driving the turbine during the cooling off period, and a starting machine set consisting of an asynchronous drive motor shaft-coupled to an asynchronous generator. Power to drive the asynchronous motor is supplied either from the network if live or from an auxiliary power source consisting of a Diesel motor-generator set, and switching means are provided for interconnecting the stators of the asynchronous and synchronous generators such that power is transferred from the former to the latter, to supply the torque necessary to bring the turbine up to the "acceleration" speed.

3 Claims, 1 Drawing Figure

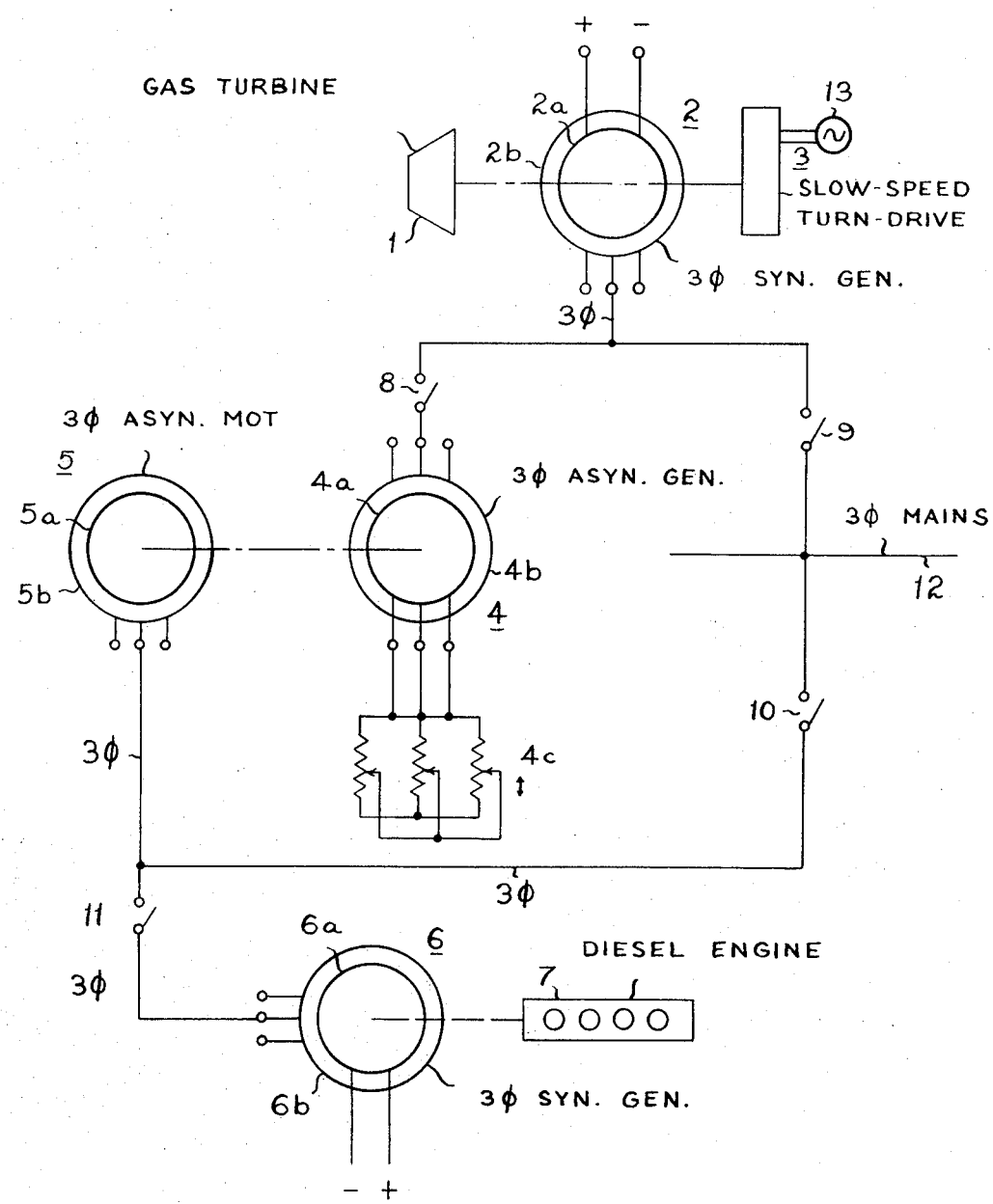

APPARATUS FOR STARTING A GAS TURBINE WHICH IS SHAFT-COUPLED TO A SYNCHRONOUS GENERATOR AND TO A TURN-DRIVE WITH CLUTCH RELEASE

The invention is concerned with an apparatus for starting a power generating set consisting of a gas turbine which is shaft-coupled to a synchronous generator and also to a "turn-drive" which is used during the initial starting phase of the gas turbine and also to drive the gas turbine during a "cooling-off" operation at a very low rotary speed.

It is a known fact that gas turbines can not start off from standstill. It is necessary to bring gas turbines up to a certain speed by use of external source of power, thus enabling them to develop their own moment of rotation. In case of the known types of gas turbines, ignition is usually accomplished at a speed close to 20 percent of the rated r.p.m. However, at this speed the gas turbine is still unable to generate a sufficient torque for further acceleration. Only after it has been brought up to a speed higher than one half of the rated r.p.m. will the gas turbine be able to generate such torque. This "acceleration r.p.m." can amount to approximately 2,000 r.p.m. and in the case of a large-sized gas turbine set, a speed of even 3,000 r.p.m. may be necessary.

It is known to employ a special starting motor to start and speed up a gas turbine until it reaches its acceleration r.p.m. If electrical power is available, an electromotor of the asynchronous type can be utilized for this purpose. However, such a starting motor increases the over-all length of the machine in an undesirable manner, and it has the additional disadvantage that it will continue to run, without load, during the entire operation unless an overriding clutch is provided at extra cost. Furthermore, unless a gearing is provided between the starting motor and gas turbine, the power taken from the electric mains will exceed significantly the power actually needed for this acceleration. In case of a 3,000-revolution gas turbine, the power taken from the network will exceed the power requirement for the acceleration by approximately 50 percent. The power difference must be eliminated within the starter, leading to another additional expenditure.

It is also known to provide the synchronous generator, to be driven by the gas turbine, with a separate start winding, possesing a greater number of poles, specifically twice the number of the in-service winding. In the case of this known arrangement, the start winding of the synchronous machine is connected with the power line, with the exciting winding cut off. The synchronous machine will then begin to run, and upon reaching 20 percent of the rated r.p.m. the gas turbine is ignited, as explained above. It is speeded up higher by the synchronous motor through excitation of the start winding until the gas turbine reaches approximately 50 percent of its rated r.p.m. From this point on, any further increase in speed is accomplished by the gas turbine proper which can now, and only now, deliver a torque (German Pat. No. 1,042,747). However, this known arrangement cannot accomplish an acceleration speed of 2,000 r.p.m. necessary in case of larger-sized gas turbines. Also, this known arrangement has the disadvantage that it requires the presence of a second winding, thus increasing the rated output of the synchronous generator.

Also known is a method for the starting of synchronous machines whereby the synchronous machine, being at stand-still, is connected with a running asynchronous generator and its rotor is given a slight rotary motion (strike). However, this known method is not meant to be used for the start of a gas turbine group. It is designed to accelerate a synchronous machine until it reaches its full rated r.p.m. and thereupon to synchronize it with the network (German Pat. No. 360,534).

Another serious difficulty arises in connection with a gas turbine power plant which operates as an isolated unit and therefore cannot draw great amounts of energy from an existing power supply when the turbines are to be re-started after a shut-down of the plant. In this case, the start requires the use of a Diesel generator set, with the Diesel engine significantly oversized in view of the above discussed increase in power requirements, thus causing much higher costs and need for additional space.

The primary object of the present invention is to provide an improved arrangement for the starting of gas turbines which are coupled with synchronous generators whereby, for the purpose of the starting process, the power taken from the supplying network is lower than in the case of the prior known arrangements, and whereby it becomes possible to design the generator set, needed in the case of isolated unit operation for the start of a gas turbine, smaller in size in comparison with the sets of the known arrangements. The invention also makes feasible the change-over switching of one starting apparatus to various gas turbine aggregates, so that only one starting apparatus will be required for one power plant.

The invention solves the problem, in connection with the above specified arrangement, by use of a starting machine set which consists of an asynchronous generator and an asynchronous motor, their synchronous r.p.m. being in the same proportion as is the power i.e. the mains frequency to the product from the number of pairs of poles of the synchronous machine and 1/60th of the self-acceleration r.p.m. of the gas turbine, whereby switching means are provided which permit during the starting operation of the gas turbine the electrical connections of the asynchronous generator with the stator of the synchronous machine, which is full-excited and is rotating at the beginning of the starting operation at the "turn" r.p.m., until the gas turbine reaches the self-acceleration r.p.m., and whereby additional switching means are provided which permit connection of the synchronous machine with the network upon reaching the rated r.p.m. after acceleration by the gas turbine. The gas turbine, after reaching the self-acceleration r.p.m., will then become self-sufficient to further accelerate the synchronous machine without further assistance from the starter machine set until the rated r.p.m. is reached. Subsequently, the synchronous machine can be synchronized with the network.

In the case of a power plant operating as an isolated unit, it will be expedient to employ a generator which is driven by a Diesel motor to supply the drive motor of the asynchronous generator.

A preferred species of the invention uses an asynchronous generator with a slip ring rotor, where the slip rings can be short-circuited through variable resistors.

In the case of the arrangement proposed by the invention for the conduct of a starting operation, the turn drive, which is connected to the synchronous generator by means of an overriding clutch and which must always be present for the turning of the turbine shaft during the cooling off process, is activated and the gas turbine is accelerated to an r.p.m. of approximately 1 to 2 percent of the rated r.p.m. The stator winding of the asynchronous generator had previously been switched to the stator winding of the synchronous generator, and the machine set, consisting of asynchronous motor and asynchronous generator, had been started. Activation of the exciter circuit of the synchronous generator will induce a voltage in the stator winding of the synchronous generator which will force a current of very low frequency through the stator winding of the asynchronous generator, thereby building up a field of rotation within the asynchronous machine.

So long as the frequency of this current is smaller than the frequency which corresponds to the rated r.p.m., the rotor of the asynchronous machine will rotate oversynchronous, relative to the rotary field built up by the stator current. The asynchronous machine will thus operate as a generator and transfers one part of the energy, fed into it mechanically by way of the shaft, to the synchronous generator in the form of an acceleration performance. If the ratio of the number of pairs of poles in the asynchronous motor and the asynchronous generator is for example 3 to 2, the synchronous generator, coupled with the gas turbine, will speed up to approximately two-thirds of the rated r.p.m.

Additional details and advantageous further developments of the invention are contained in the practical example, described below and illustrated in the form of a circuit and schematic diagram in the accompanying drawing.

With reference now to the drawing, the gas turbine is denoted by 1, its load the 3-phase synchronous generator, shaft coupled with the turbine, by 2, and the so-called "turn drive," shaft coupled with the rotor 2a of synchronous generator 2 and hence also gas turbine 1 by means of an overriding clutch, by 3. 4 denotes the asynchronous generator the rotor 4a of which is coupled with the rotor 5a of a 3-phase asynchronous motor 5. As previously indicated, the rotor 4a of the asynchronous generator 4 is preferably of the slip ring rype and the slip rings are short-circuited through variable resistors 4c. The stator 5b of asynchronous motor 5 can be energized from the 3 phase electric mains 12 by way of switch 10, or from the stator 6b of a 3-phase synchronous generator 6, the rotor 6a of which is driven by a Diesel motor 7 and connected by way of switch 11. Switch 8 connects electrically the winding on the stator 4b of the asynchronous generator 4 with the winding on the stator 2b of the synchronous generator 2, and switch 9 connects electrically the winding on the stator 2b of the synchronous generator 2 with the 3 phase electric mains 12.

In order to begin the starting operation, the Diesel motor 7 is started up — if the electric mains are dead — and switch 11 is closed. The asynchronous motor 5 can be accelerated by energizing the excitation winding on the rotor 6a of the synchronous generator 6. The closing of switch 8 accomplishes an electrical connection between the winding on the stator 4b of the asynchronous generator 4 and the winding on the stator 2b of the synchronous generator 2. So long as the synchronous generator 2 is at a standstill, this connection has no effect. If the winding on the rotor 2a of the synchronous generator 2 is excited and the "turn drive" 3, the motor 13 of which can also be fed from the synchronous generator 6, is energized, a voltage is now induced in the stator winding of the synchronous generator 2, its frequency corresponding to the r.p.m. of the synchronous generator, forcing a corresponding current through the stator winding of the synchronous generator 2 and the stator winding of the asynchronous generator 4, with the current generating a field of rotation within the latter. The rotor 4a of the asynchronous generator 4 will turn oversynchronous relative to this field of rotation so that the asynchronous generator 4 will now begin to operate as a generator and transfer one portion of the energy, fed into it mechanically by the asynchronous motor 5 by way of the interconnecting shaft, to the synchronous generator 2 in the form of an acceleration performance. Thus, the machine set, consisting of gas turbine 1 and synchronous generator 2, is accelerated to reach the r.p.m. which corresponds to the generated frequency, and which is slightly above the level at which the gas turbine can deliver a torque. Further acceleration takes place, after opening switch 8, by the moment of rotation of the gas turbine which, as mentioned above, had been ignited at an r.p.m. of approximately 20 percent of the rated r.p.m. After synchronization has been accomplished, switch 9 can be closed if the electric mains are alive.

The starting arrangement proposed by the invention makes it feasible to use a Diesel set 7–6 that is one-third lower in output than the units required by the known arrangements. For example, the start of a 60 MW gas turbine set requires only an output of approximately 3 MW in the case of asynchronous power units and the Diesel set, if needed. In comparison, 4.5 MW are required by the equipment representing the present state of art.

I claim:

1. Apparatus for starting a power generating plant that includes a gas turbine shaft-coupled to the rotor of a synchronous generator and a turn-drive coupled to the gas turbine-generator set for driving the latter at a low speed during a cooling off period of the gas turbine which comprises, a starting machine set consisting of an asynchronous generator the rotor of which is shaft-coupled to the rotor of an asynchronous drive motor therefor, the synchronous speeds of said coupled asynchronous generator and drive motor being in the same proportion as is the frequency of the power supply mains to which said synchronous generator delivers its output to the product from the number of pairs of poles on said synchronous generator and 1/60th of the self-acceleration speed at which said gas turbine then becomes self-sufficient to develop further acceleration to reach its rated speed, first switching means for interconnecting the windings on the stators of said synchronous generator and asynchronous generator at the beginning of the starting procedure when the excitation winding on the rotor of said synchronous machine is fully energized and the gas turbine-generator set is set into rotation by said turn-drive at a speed of approximately 1 to 2 percent of its rated speed thereby to develop a flow of power from said asynchronous generator into said synchronous generator which effects an acceleration of said gas turbine-generator set, said first switching means remaining closed until said gas turbine-generator set has reached the said self-acceleration speed, and second switching means for thereafter re-connecting the winding on the stator of said synchronous generator to said power supply mains when the rated speed of said synchronous generator has been reached.

2. Apparatus for starting a power generating plant as defined in claim 1 and which further includes a diesel motor shaft coupled to the rotor of a second synchronous generator, the stator winding of said second synchronous generator being connected to the stator winding of said asynchronous motor.

3. Apparatus for starting a power generating plant as defined in claim 1 wherein said asynchronous generator is of the type having a slip ring rotor, and wherein means are provided for interconnecting said slip rings through variable resistors.

* * * * *